(12) United States Patent
Chuang

(10) Patent No.: US 8,605,214 B2
(45) Date of Patent: Dec. 10, 2013

(54) ELECTRONIC APPARATUS WITH STAND MECHANISM FOR MAGNIFICATION FUNCTION

(75) Inventor: Tsung-Jen Chuang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/335,959

(22) Filed: Dec. 23, 2011

(65) Prior Publication Data

US 2013/0021523 A1 Jan. 24, 2013

(30) Foreign Application Priority Data

Jul. 18, 2011 (TW) .............................. 100125357 A

(51) Int. Cl.
*H04N 5/225* (2006.01)
(52) U.S. Cl.
USPC .......................................................... 348/375

(58) Field of Classification Search
USPC ...................... 348/333.01, 373–376; 396/428
See application file for complete search history.

(56) References Cited

U.S. PATENT DOCUMENTS

| 4,360,264 | A * | 11/1982 | Baker et al. ...................... 355/40 |
| 6,209,834 | B1 * | 4/2001 | Stonehouse ................ 248/274.1 |
| 7,212,318 | B2 * | 5/2007 | Bradbery ....................... 358/474 |
| 7,626,634 | B2 * | 12/2009 | Ohki et al. .................... 348/373 |
| 2007/0035655 | A1 * | 2/2007 | Chen et al. .................... 348/373 |
| 2009/0002548 | A1 * | 1/2009 | Liang et al. ................... 348/373 |

\* cited by examiner

*Primary Examiner* — James Hannett
*Assistant Examiner* — Akshay Trehan
(74) *Attorney, Agent, or Firm* — Altis Law Group, Inc.

(57) ABSTRACT

An exemplary electronic apparatus includes a portable electronic device and a stand mechanism for supporting the portable device. The portable electronic device includes a display panel and a digital camera. The display panel and the digital camera are respectively disposed at a viewing surface and a bottom surface at opposite sides thereof. When the stand mechanism is in use, the digital camera has a predetermined height above a bottom of the stand mechanism.

2 Claims, 3 Drawing Sheets

ELECTRONIC APPARATUS WITH STAND MECHANISM FOR MAGNIFICATION FUNCTION

BACKGROUND

1. Technical Field

The present disclosure relates to portable electronic device accessories, and particularly to a stand mechanism for enhancing a magnification function of a portable electronic device.

2. Description of Related Art

Many portable electronic devices, such as mobile phones, include a display and a digital camera. It is common for the digital camera to have a zoom function. As such, a user may sometimes use the portable electronic device as a magnifying device, wherein a lens of the digital camera functions to allow an enlarged view of a tiny object to be observed by the user.

However, the portable electronic device is typically a handheld device. Therefore because of problems such as hand shaking etc., it can be difficult to ensure that a distance between the digital camera and the object is steady, and so it can be correspondingly hard to obtaining a clear magnified view of the object.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will now be made to the drawings to describe certain exemplary embodiments of the present disclosure in detail.

Figure 1:
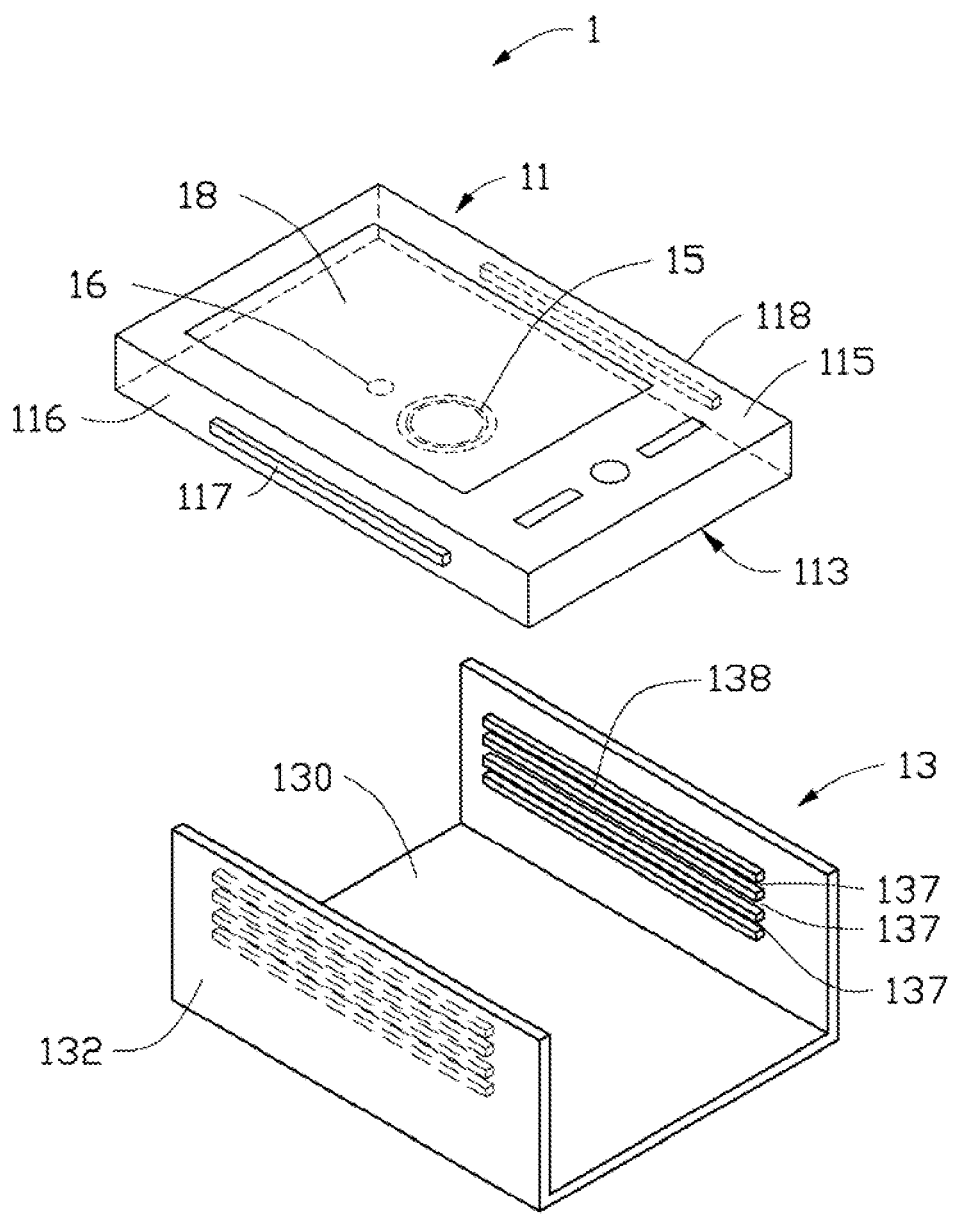
FIG. 1 is an exploded, isometric view of an electronic apparatus according to a first embodiment of the present disclosure, the electronic apparatus including a portable electronic device and a stand for supporting the portable electronic device.

The present disclosure provides an electronic apparatus, which includes a portable electronic device and a stand mechanism for supporting the portable electronic device. Referring to FIG. 1, an exploded, isometric view of an electronic apparatus 1 according to a first embodiment of the present disclosure is shown. The electronic apparatus 1 includes a portable electronic device 11 and a stand 13.

The portable electronic device 11 may be a mobile phone or other device having a display on one side and a camera on an opposite side. In the present embodiment, the portable electronic device 11 includes a display panel 18 disposed at a top viewing surface 115, and a digital camera 15 embedded in an opposite bottom surface 113. A pair of elongated sliders 117 protrudes from a first side surface 116 and an opposite second side surface 118 of the portable electronic device 11, respectively. In one embodiment, the portable electronic device 11 may also include a light source 16 disposed at the bottom surface 113, adjacent to the digital camera 15. The light source 16 may be a light emitting diode (LED) to act as a flash to illuminate scenes for the digital camera 15.

The stand 13 includes a bottom plate 130, and two opposite sidewalls 132 perpendicularly extending in parallel from opposite edges of the bottom plate 130. A distance between the two sidewalls 132 may be substantially equal to or slight greater than a width of the portable electronic device 11. Each sidewall 132 includes a plurality of rails 138, which are disposed parallel to and at different heights above the bottom plate 130. A plurality of sliding grooves 137 are correspondingly defined at the sidewalls 132. That is, each sliding groove 137 is defined between two corresponding adjacent rails 138 of one of the sidewalls 132. The sliding grooves 137 are provided to receive the sliders 117 to adjustably support the portable electronic device 11.

For example, to use the portable electronic device 11 as a magnifier device, an object to be magnified may be positioned on the bottom plate 130 by a user. The user can then choose the wanted distance between the portable electronic device 11 and the object by engaging the portable electronic device 11 in the sliding grooves 137 at a desired height; that is, the user inserts the sliders 117 to slide along a selected pair of the sliding grooves 137. The digital camera 15 can then be used to provide a magnified view of the object on the display panel 18; and if additional light is needed, the light source 16 can be turned on.

Furthermore, the bottom plate 130 of the stand 13 may be made of transparent material. When the portable electronic device 11 is used as the magnifier device, an object to be magnified may be positioned under the bottom plate 130 and in contact with the bottom plate 130. In detail, the object such as a book may be disposed on a supporting surface such as a tabletop or a desktop, and the bottom plate 130 of the stand 13 is disposed on the object and supported by the object. The user can choose the distance between the portable electronic device 11 and the object by engaging the portable electronic device 11 in the sliding grooves 137 at a desired height; that is, the user inserts the sliders 117 to slide along a selected pair of the sliding grooves 137.

In the illustrated electronic apparatus 1, because the stand 13 can maintain the desired height of the portable electronic device 11 and provide hands-free support for the portable electronic device 11, clear magnified views can be easily and conveniently obtained. Furthermore, because the stand 13 of the electronic apparatus 1 can also hold an object to be magnified, the user can enjoy the magnified views completely hands-free.

Figure 2:
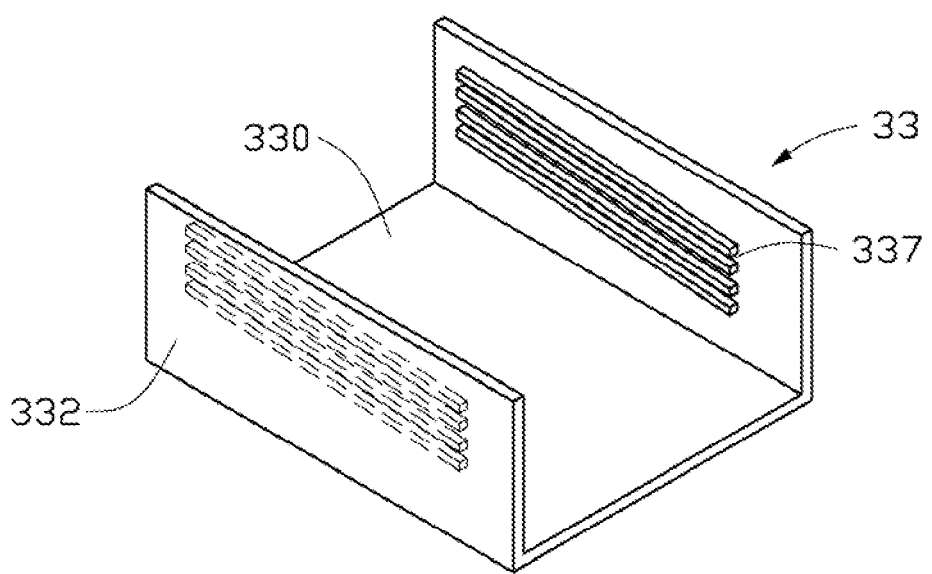
FIG. 2 is an isometric view of a stand of an electronic apparatus according to a second embodiment of the present disclosure.

FIG. 2 is an isometric view of a stand of an electronic apparatus according to a second embodiment of the present disclosure. The stand 33 is similar to the above-described stand 13 of the first embodiment, but differs in that rails 138 incline generally towards a bottom plate 330, such that sliding grooves 337 on sidewalls 332 are oriented at an oblique angle to the bottom plate 330 (rather than being parallel to the bottom plate 330). The angle is in the range from greater than 0 degrees to less than 90 degrees, and is preferably in the range from greater than 0 degrees to less than 45 degrees. Therefore, the portable electronic device 11 can be supported at an oblique angle relative to the object to be magnified.

Figure 3:
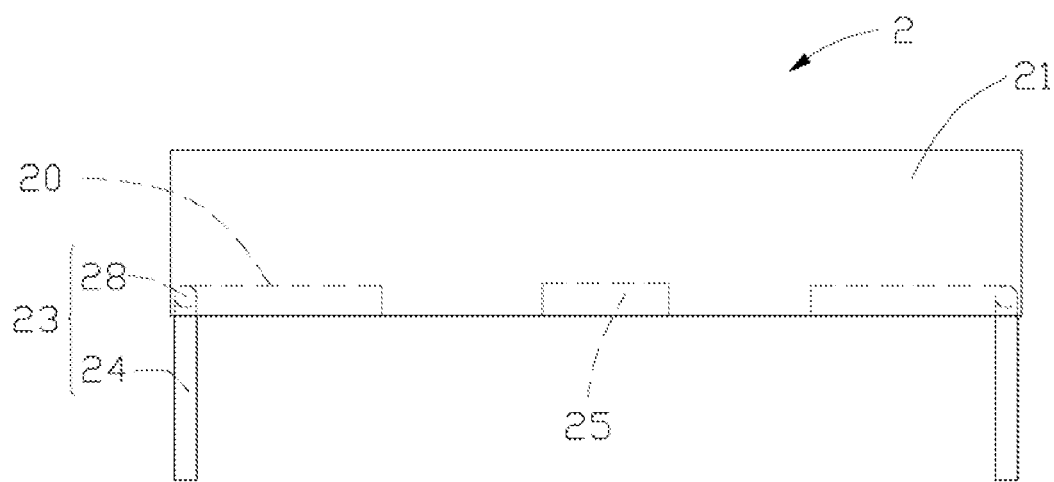
FIG. 3 is a side view of an electronic apparatus according to a third embodiment of the present disclosure, the electronic apparatus including a portable electronic device and a pair of stands for supporting the portable electronic device.

FIG. 3 is a side view of an electronic apparatus according to a third embodiment of the present disclosure. The electronic apparatus 2 includes a portable electronic device 21, and a pair of stands 23 for supporting the portable electronic device 21. The portable electronic device 21 has a digital camera 25 embedded in a bottom surface thereof. Each stand 23 may include a supporting plate 24 and a pivot 28. The pair of supporting plates 24 are foldably engaged with the portable electronic device 21 at opposite bottom edges of the portable electronic device 21 via the pivots 28. When the supporting plates 24 are unfolded, the portable electronic device 21 can be supported by the supporting plates 24 such that the digital camera 25 has a predetermined height above a plane defined between bottom ends of the stands 23. Moreover, a pair of receiving recesses 20 can be defined in opposite sides of the bottom surface of the portable electronic device 21. When the supporting plates 24 are folded up, the supporting plates 24 can be received and stowed in the receiving recesses 20.

To use the portable electronic device 21 as a magnifier device, an object to be magnified may be positioned on a supporting surface such as a tabletop (or a desktop).

The supporting plates 24 are stood on the tabletop and support the portable electronic device 21, with the camera 25 aligning with the object.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of shape, size and arrangement of parts within the principles of the present disclosure to the full extent indicated by the broad general meaning of the terms in which the appended claims are expressed.

What is claimed is:

1. An electronic apparatus, comprising:
a portable electronic device having a viewing surface and a bottom surface at opposite sides thereof, the portable electronic device comprising a display panel disposed at the viewing surface and a digital camera disposed at the bottom surface; and
a stand mechanism for supporting the portable electronic device;
wherein the portable electronic device further comprises a first side surface, a second side surface opposite to the first side surface, and a pair of sliders respectively protruding from the first side surface and the second side surface; the stand mechanism comprises a plurality of sliding grooves, and the pair of sliders are slidably engaged in a selected pair of the sliding grooves;
wherein the stand mechanism comprises a bottom plate and two opposite sidewalls perpendicularly extending from opposite edges of the bottom plate;
wherein the plurality of sliding grooves are formed at the sidewalls and are at different heights above the bottom plate;
wherein each of the sidewalls of the stand mechanism comprises a plurality of rails disposed at different heights above the bottom plate, and each of the sliding grooves is defined between two corresponding adjacent rails of one of the sidewalls;
wherein the rails are all parallel to the bottom plate.

2. An electronic apparatus, comprising:
a portable electronic device comprising a digital camera embedded in a bottom surface thereof; and
a stand mechanism configured for supporting the portable electronic device in a position such that the digital camera is at a predetermined height above a bottom of the stand mechanism;
wherein the portable electronic device further comprises a first side surface, a second side surface opposite to the first side surface, and a pair of sliders respectively protruding from the first side surface and the second side surface; the stand mechanism comprises a plurality of sliding grooves, and the pair of sliders are slidably engaged in a selected pair of the sliding grooves;
wherein the stand mechanism comprises a bottom plate and two opposite sidewalls perpendicularly extending from opposite edges of the bottom plate;
wherein the plurality of sliding grooves are formed at the sidewalls and are at different heights above the bottom plate;
wherein each of the sidewalls of the stand comprises a plurality of rails disposed at different heights above the bottom plate, and each of the sliding grooves is defined between two corresponding adjacent rails of one of the sidewalls;
wherein the rails are all parallel to the bottom plate.

* * * * *